April 16, 1946.  C. N. KAHL  2,398,378
ENGINE
Filed July 5, 1941   10 Sheets-Sheet 3

Charles N. Kahl
INVENTOR.
BY Rummler Rummler & Davis
ATTORNEYS.

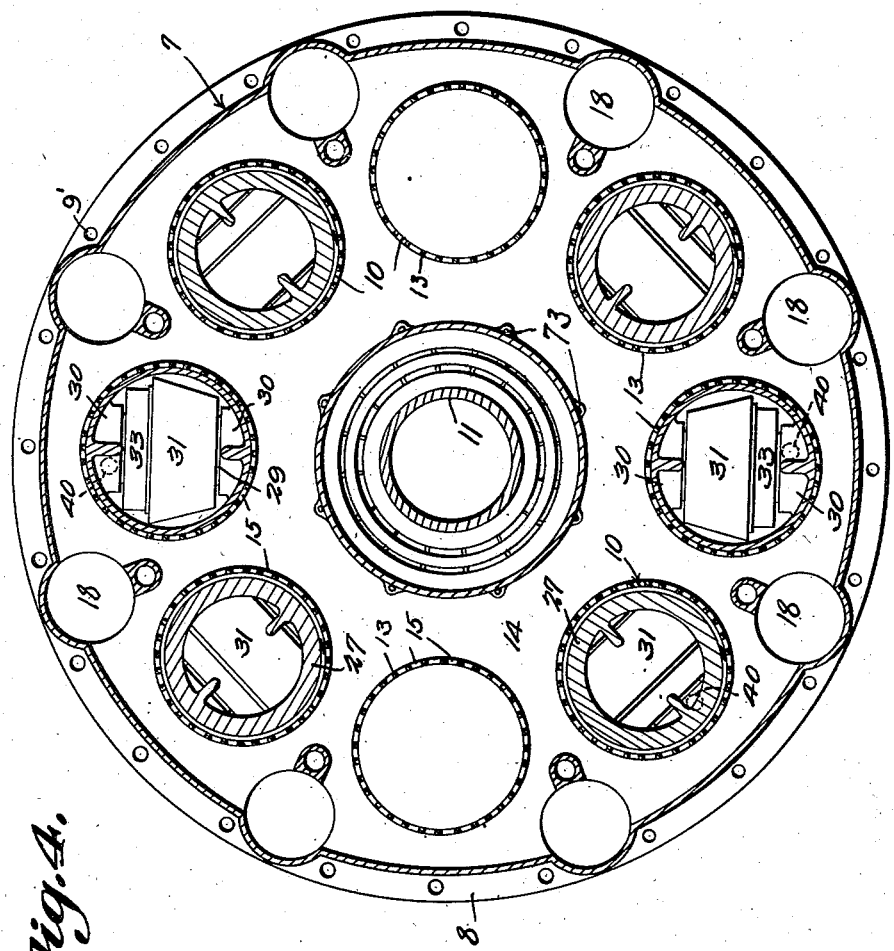

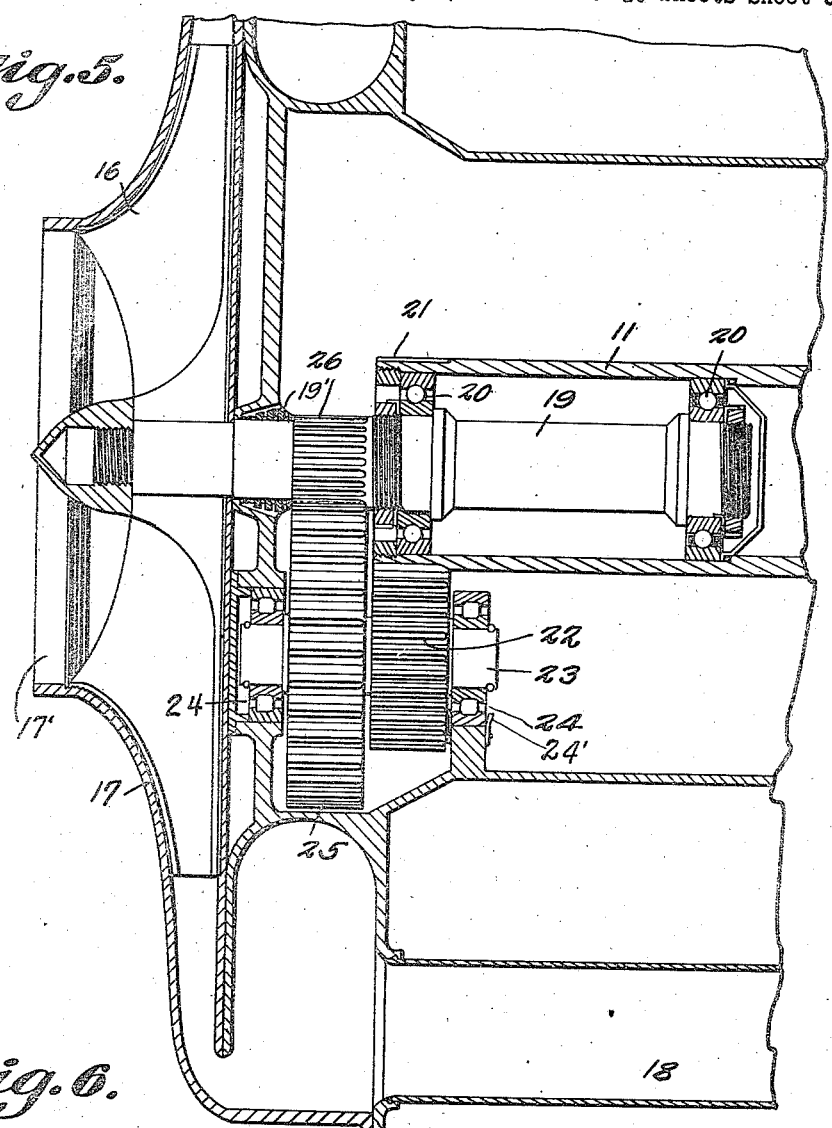
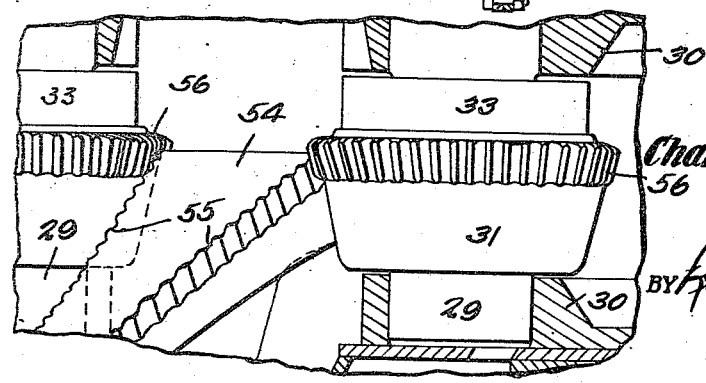

April 16, 1946.    C. N. KAHL    2,398,378
ENGINE
Filed July 5, 1941    10 Sheets-Sheet 6
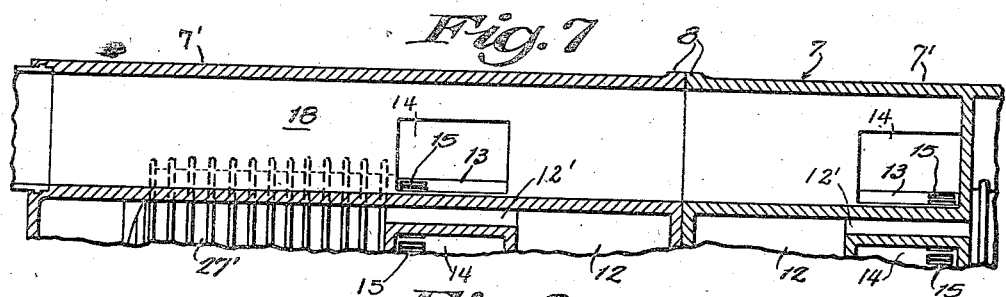
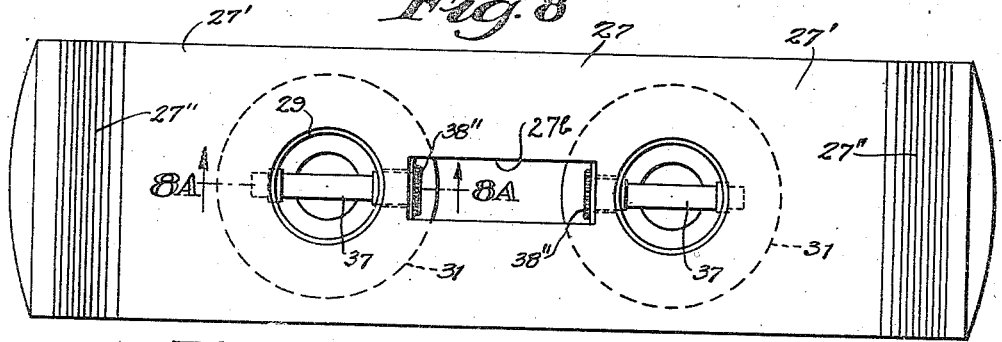
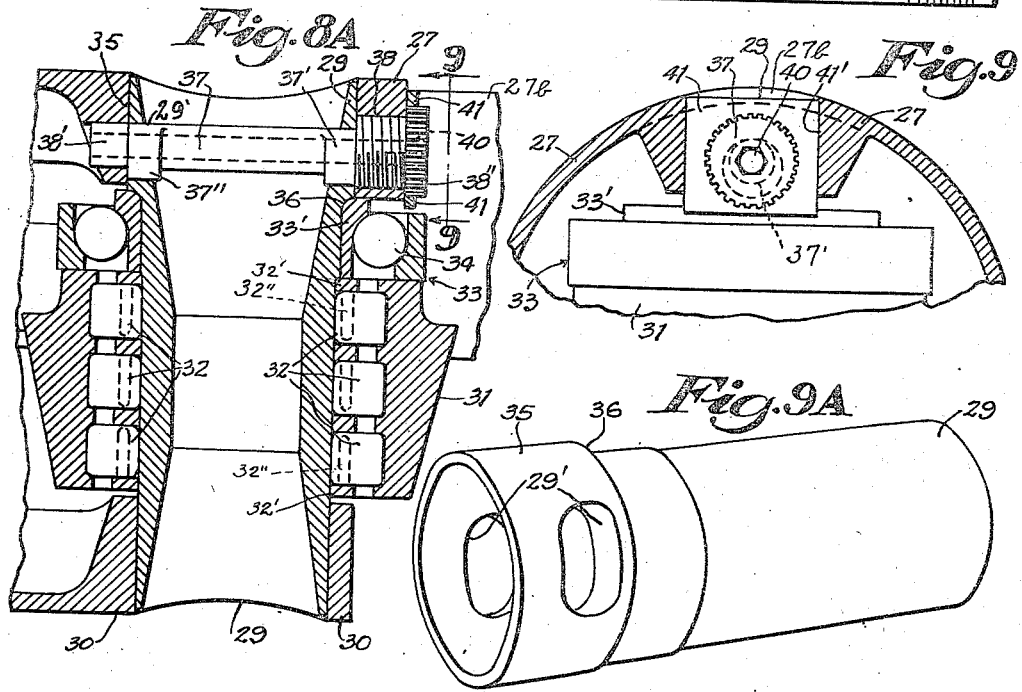
Charles N. Kahl,
INVENTOR,
BY
ATTORNEY.

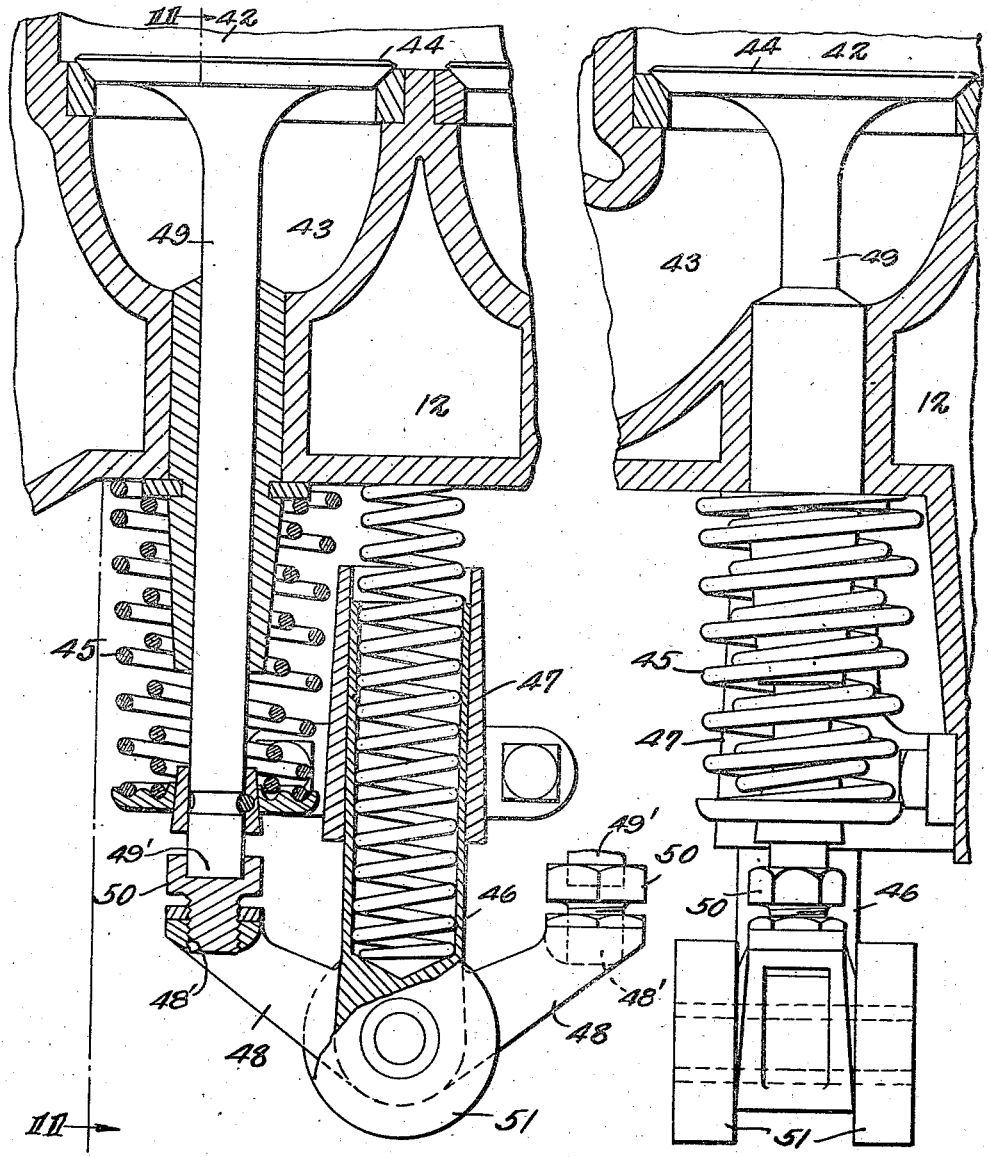

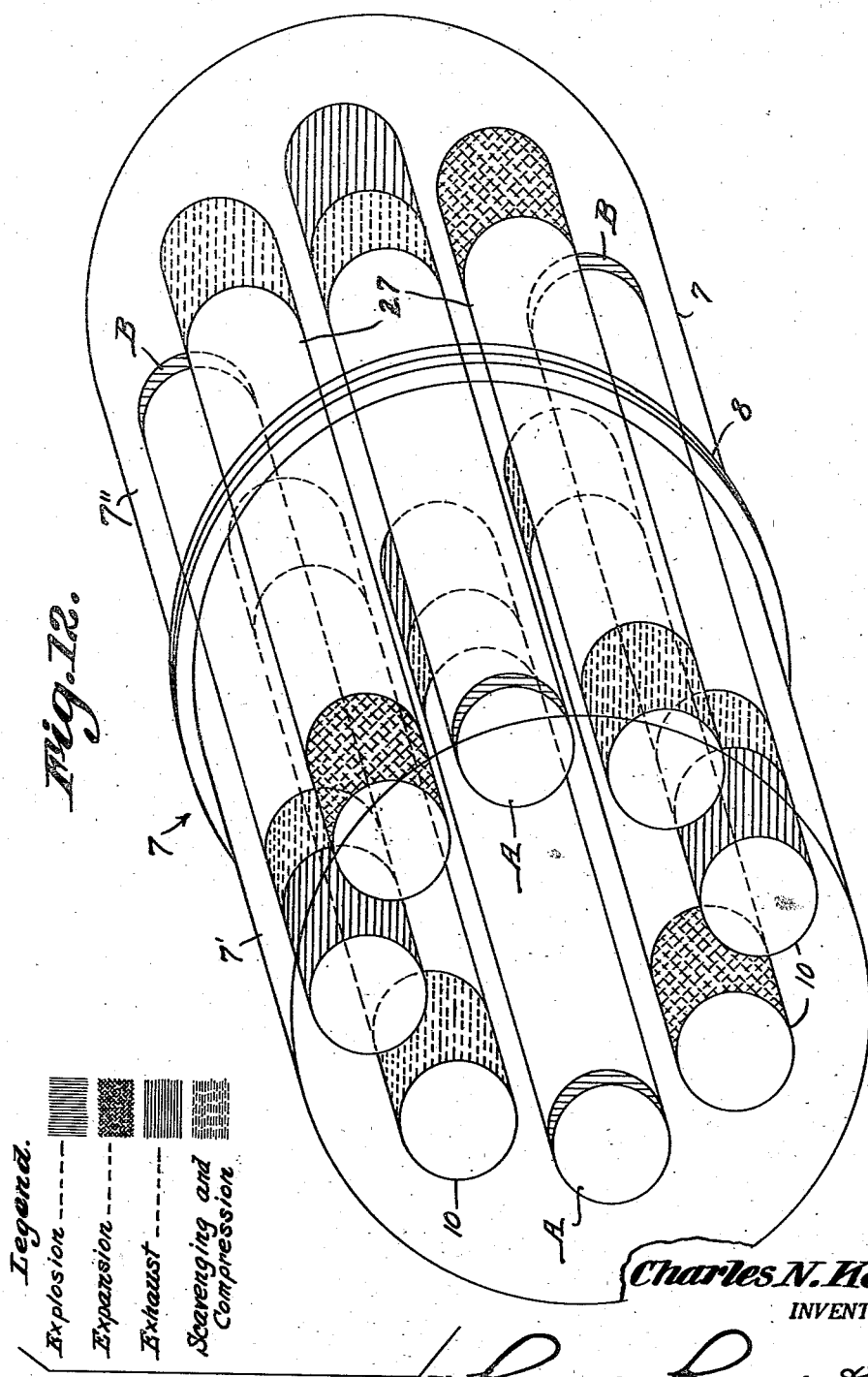

April 16, 1946.   C. N. KAHL   2,398,378
ENGINE
Filed July 5, 1941   10 Sheets-Sheet 9
Fig. 13.
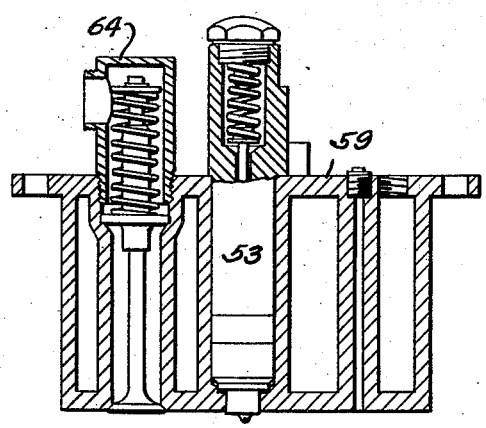
Fig. 16.
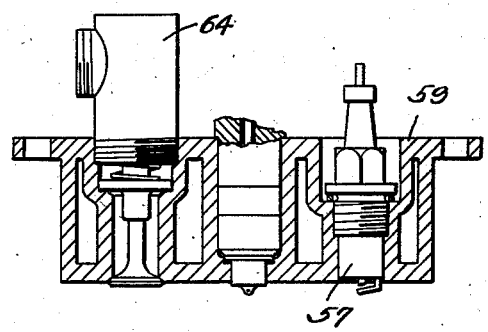
Fig. 14.
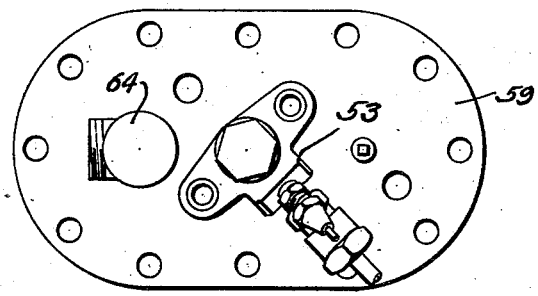
Fig. 17.
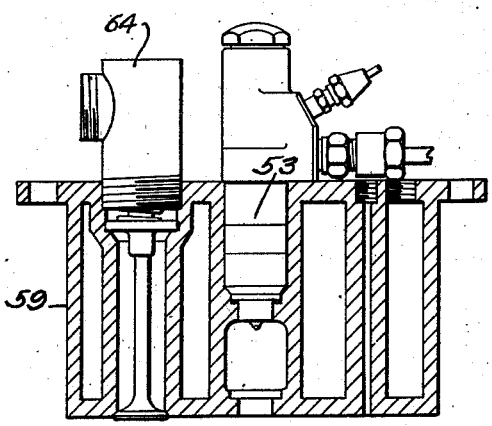
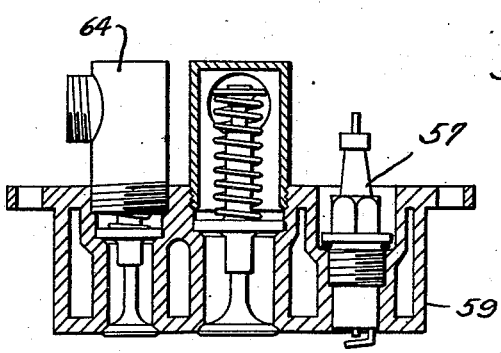
Fig. 15.
Charles N. Kahl
INVENTOR,
BY Rummler Rummler & Davis
ATTORNEYS.

April 16, 1946.　　　　C. N. KAHL　　　　2,398,378
ENGINE
Filed July 5, 1941　　　10 Sheets-Sheet 10
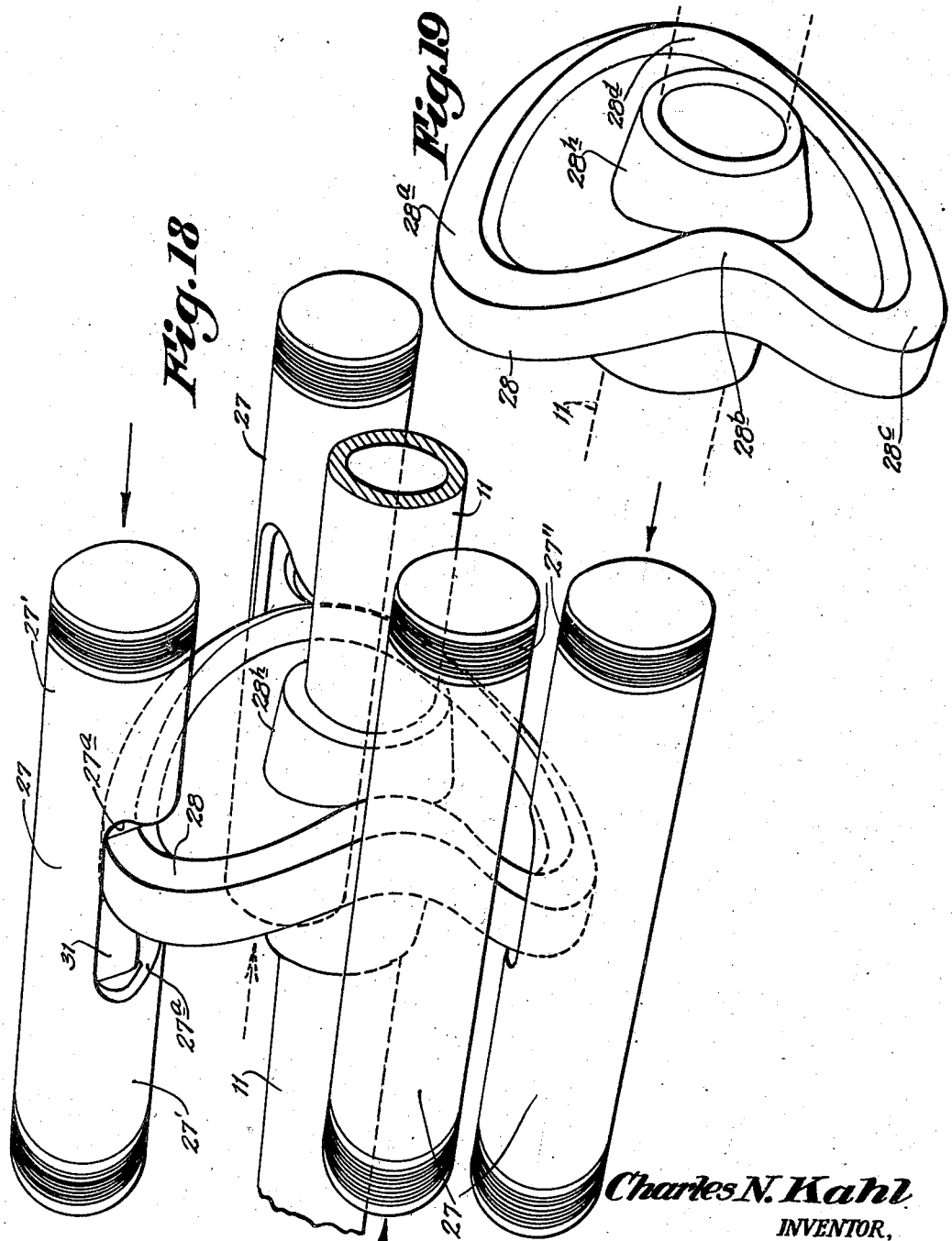
Charles N. Kahl
INVENTOR,
BY
ATTORNEYS.

Patented Apr. 16, 1946

2,398,378

UNITED STATES PATENT OFFICE 2,398,378

ENGINE

Charles N. Kahl, Jacksonville, Ill., assignor of one-half to Lee A. Sullivan, Jacksonville, Ill.

Application July 5, 1941, Serial No. 401,243

19 Claims. (Cl. 123—58)

My invention relates to engines of the cylindrical cam type; that is to say, engines in which rotary energy is supplied to a shaft by piston force applied camwise to a wabble plate thereon from appropriately energized cylinders disposed parallel with the shaft. The cam plate receives its energy from duplex pistons, that is to say, those having two elements disposed in alinement on opposite sides of the cam, respectively, and each energized by its own cylinder elements. (See Fig. 2.) Engines of this general sort heretofore made and described have been known variously as "round," "barrel-type," "parallel-cylinder," "axial-type," "swash-plate," "wabble-plate" and "crankless" engines.

It must be noted, however, that all such engines preceding the present improvements have been subject to many serious defects and shortcomings such as to preclude any wide practical acceptance or use, as will be explained, especially in the aircraft industry for which some of them were primarily intended.

Considered now, more in detail, my invention concerns a mechanism embodying the principles of balanced inertia and has to do with gaseous compression, explosive combustion and expansion, as in an internal combustion engine of the kind herein especially referred to and described. The invention, in appropriate species of its various possible embodiments, is adapted for use in steam, gas, gasoline or Diesel engines, or in connection with an air compressor, and particularly is adapted for use in that type of mechanism wherein the cylinders are parallelly disposed symmetrically about a power transmitting rotary shaft.

An important object is to operatively combine the two-cycle operation and double-acting piston ideas and thus to economize space, increase speed and make for better general efficiency.

I also aim in effect to prevent or nullify certain very objectionable strains and stresses usually characterizing engines of the general type here concerned, and I aim to eliminate and avoid periodic vibrations such as occur in the prior devices.

Another object of the invention is to provide an engine of this type having pairs of opposed cylinders or groups of mutually balanced cylinders so disposed in relation to a multilobed cam that longitudinally opposed cylinders disposed in diametrically opposite pairs or equivalent balanced relation about the shaft shall perform like functions simultaneously or in equivalent balanced relation, thereby to resolve all functional and inertia forces into balanced radial and longitudinal couples, and thus to eliminate all vibration from piston inertia and reduce transverse functional vibration to a minimum or substantially zero.

Another object of my invention is to provide a multi-cylinder engine having means to enable piston and cam mutual adjustment for wear and compression balance without dismantling the engine.

A further object is to provide an engine in which the inertia forces of the piston assembly shall be cushioned by compression forces, at all times of maximum intensity, and the explosion forces shall be cushioned by the inertia forces, thereby greatly reducing and minimizing load on the bearings.

Another object is to provide in practical mechanical effect a "floating" cam structure in which the multiplicity of impelling elements shall be so balanced in mechanical arrangement and operating effect about the cam as to support it mainly and to avoid any tendency to vibrate, and thus to leave to the cam only the function of transmitting torque.

Another object is to provide for so balancing a heavy duty stationary engine of the kind described as to obviate need for customary foundations.

Another object is to provide a crankless engine of the general kind referred to in which the cam shall be operatively combined positively with a greater plurality of double ended pistons than the cam has lobes, all to be arranged symmetrically about the shaft and cam and in such manner as to bear successively on the several lobes of the cam during operation.

Still another object is to provide a crankless engine wherein the drive shaft shall be equipped with a multilobed cam and wherein there shall be antifriction rollers on the several pistons in effective relation to the cam lobes, the rollers to have positive coaction with the cam, if desired, and so prevent slippage of the rollers with respect to the cam.

A still further object is to provide an engine structure which by appropriate adjustment can be adapted to be used as a low-compression Diesel engine, a fuel-injected gasoline engine, a carburetted gasoline engine or a natural gas engine, all by changing the valve cover plugs and providing necessary accessories.

A further object is to provide an air intake pressure chamber, common in purpose and function to all of the cylinders of the engine, with corresponding feed pipes to said cylinders, to the end that the movement of air into the chambers shall be uniform and the intake pressure on all cylinders equalized.

Yet another object is to provide such a cam engine, suitable with minor alterations, to be used as an air compressor or as a steam engine.

With the foregoing and other objects in view, such as will appear as the description proceeds, the invention resides in the combination, arrangement of parts and in the details of construction, hereinafter described, and claimed, it being understood that changes in the precise embodiment of the invention herein described, may be made within the scope of what is claimed, without departing from the spirit of the invention.

I use the expression "two cycle" engine in the sense carried by the expression "two-stroke cycle" engine. I cause the air to enter at one end of the cylinder and I cause the gases of combustion to be released at the opposite, fuel intake, end. There is one explosion for each complete in-and-out movement of the piston.

Referring to the drawings:

Fig. 4 is a vertical cross sectional view taken (through the annular air intake passage) on line 4—4 of Fig. 2, through the engine body proper, the base being omitted.

Fig. 5 is an enlarged vertical axial sectional view through the blower with which the engine is provided. See left end of Fig. 2.

Fig. 6 shows a modification, on a much larger scale, of a fragmental detail, partly in section, disclosing the positive drive connection between one of the pistons and the drive shaft cam.

Fig. 7 is a fragmental sectional view, illustrating the passageways for air and water. See line 7—7 on Fig. 3.

Fig. 8 is a side elevation of one of the eight double headed pistons, viewed inwardly toward the engine axis. See Fig. 3.

Fig. 8A is a greatly enlarged sectional view taken on line 8A—8A of Fig. 8.

Fig. 9 is a fragmentary sectional view taken on line 9—9 of Fig. 8A.

Fig. 9A is a perspective view of one of the sixteen wristpins.

Fig. 10 is an enlarged sectional view, illustrating the valve assemblies.

Fig. 11 is a view taken at right angles to Fig. 10, on the line 11—11 thereof.

Fig. 12 is a diagram illustrating the firing order of the cylinders by means of which a perfect balance is produced.

Fig. 13 is a sectional view through the valve cover plug (or adapter) showing an arrangement of fuel injection plug and air starting valve for Diesel engine operation.

Fig. 14 is a plan view thereof.

Fig. 15 is a sectional view through a modified valve cover plug showing detail arrangement for use in a natural-gas engine.

Fig. 16 is a sectional view through a further modification of valve cover plug showing arrangement for use in an injection-feed gasoline engine.

Fig. 17 is a sectional view through another modification of the valve cover plug showing an arrangement for use in a pre-combustion type of Diesel engine.

Fig. 18 is a perspective view of the main shaft and cam of a simple four-lobed cam engine together with four of the eight corresponding double pistons in limit positions, the four alternate pistons being omitted for clarity in the drawings.

Fig. 19 is a perspective view of the four-lobed cam of Fig. 18, apart by itself.

Figure 2:
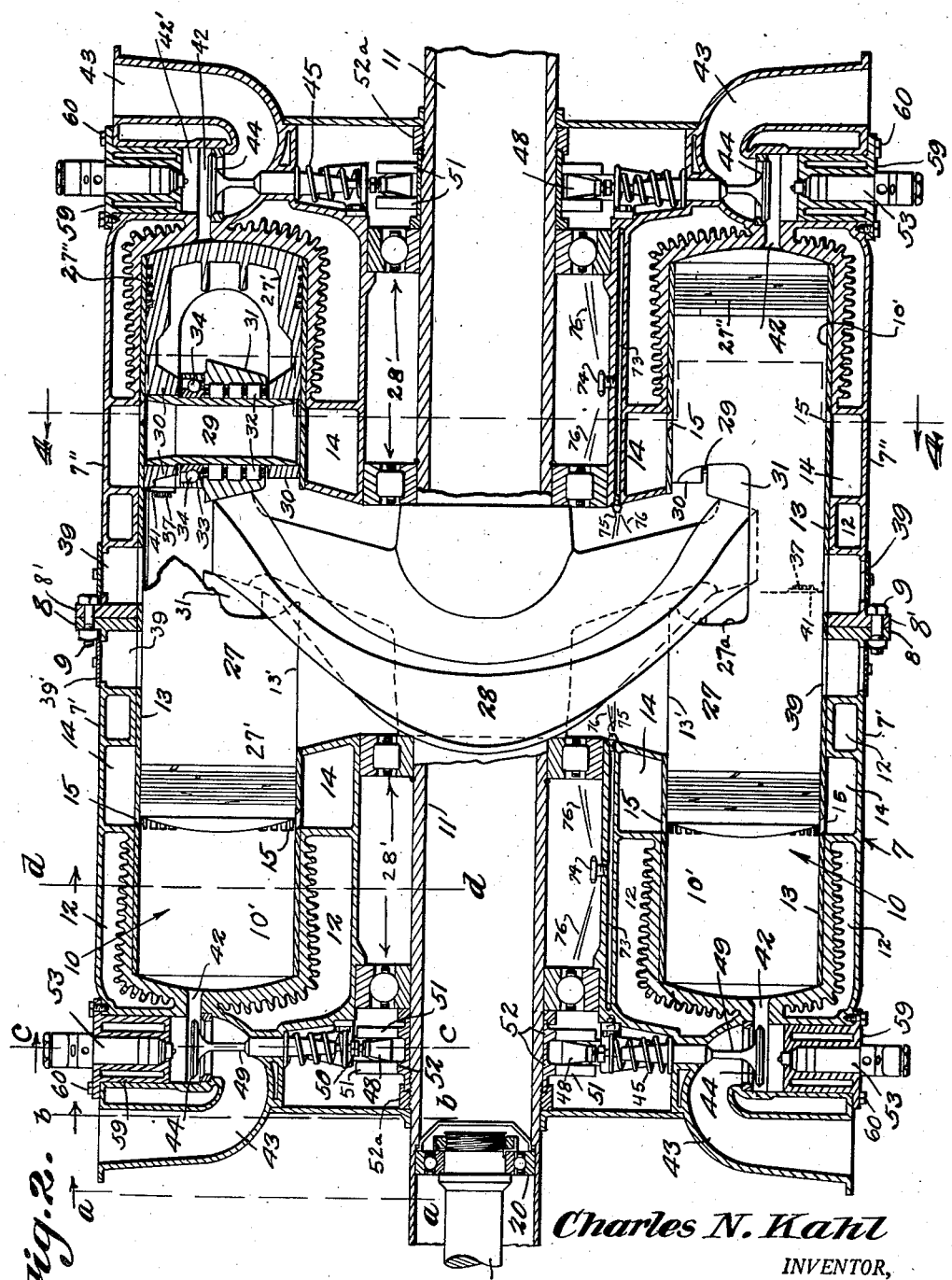
Fig. 2 is a horizontal axial sectional view through the engine.
Figure 3:
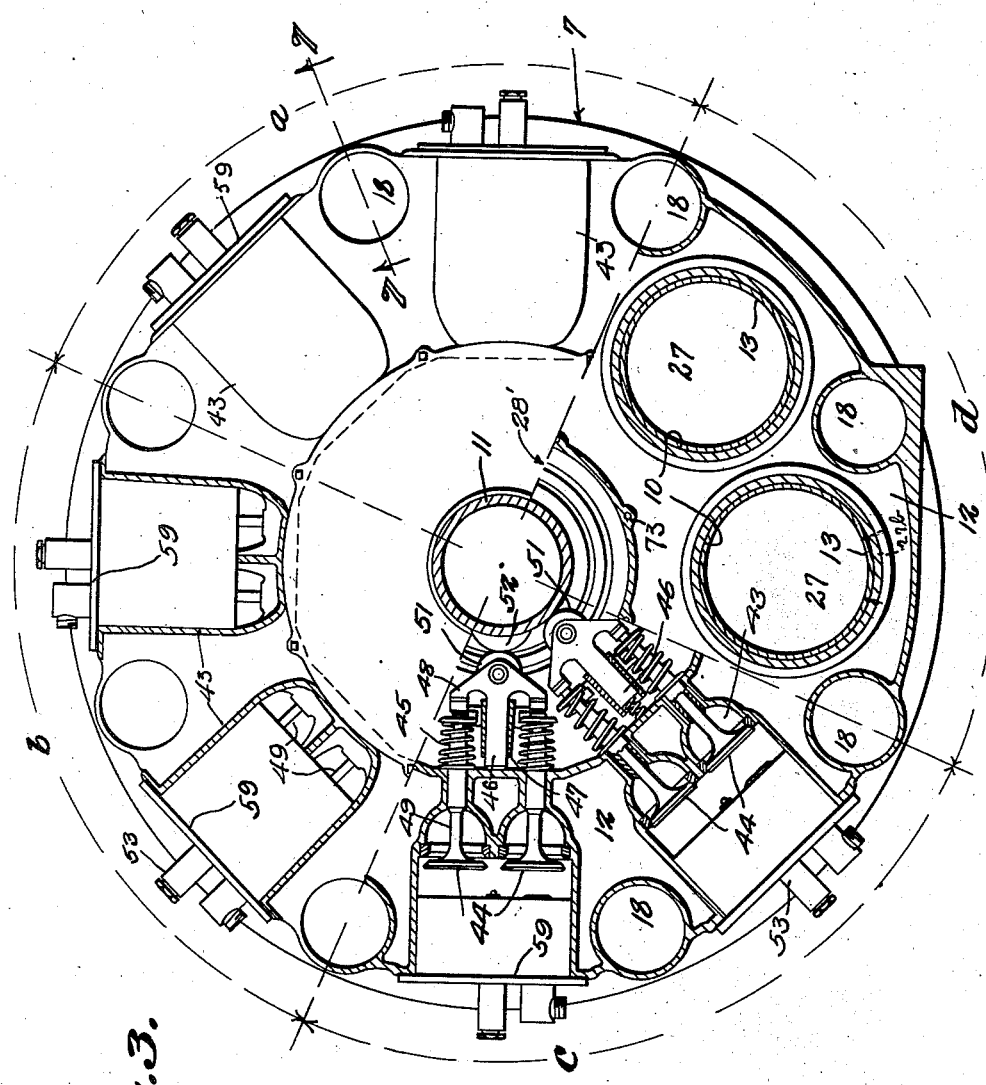
Fig. 3 is an irregular sectional view taken by quadrants substantially as on lines a—a, b—b, c—c, and d—d of Fig. 2, as indicated, the base and bearing supports being omitted.

Referring to the drawings more in detail, the engine base 5 carries uprights 6 which in turn support the engine block 7. This block 7, as shown in Fig. 2, embodies a pair of separable sections 7' and 7'' having corresponding annular abutment flanges 8 and 8' integral therewith at their inner ends which are releasably fastened together by bolts 9.

The said engine block 7 as a whole has a double annular series of combustion cylinder parts 10' arranged in alined pairs disposed symmetrically around the drive shaft 11 and parallel therewith, the block units being cast to include these and to provide bearing supports, air passageways, and a waterjacket 12 for the cylinders, as will be understood. Each double headed piston 27 uses a double ended cylinder 10. For clarity in description I have designated the entire double ended cylinder by the numeral 10 while I use the numeral 10' to designate each end part thereof.

Disposed in each cylinder part 10' is one end of a lining 13, the linings being of a length to extend between longitudinally opposed cylinder parts 10' and through the full length thereof and so help render the cylinders 10 more substantially continuous.

An air chamber 14, in a limited degree connected in common to all of the cylinders of the engine, is largely separated from the interiors of the cylinders 10 by the linings 13. These said linings are formed with ports 15 arranged substantially coplanar, and in circular alignment for each cylinder and near the inner ends of the cylinder parts 10'. Thus the air chamber 14 and cylinders 10 are all in mutual communication. There is one explosion in each cylinder element 10' for each outward movement of its corresponding piston part 27'.

Said chamber 14 is supplied forcibly with air from a rotary blower 16 in the housing 17, to which the chamber 14 communicates through the pipes 18. (See Figs. 1, 3, 4, 5 and 7.) Housing 17 is supplied with air through the air intake passages 17'.

The blower 16 is mounted on the short small shaft 19 that extends into the hollow drive shaft 11, the shaft 19 being mounted in roller bearings 20 held within the end of shaft 11 (see Fig. 5). There is packing 19' on shaft 19, as shown in Fig. 5.

To drive the blower 16, teeth 21 on the blower end of drive shaft 11 mesh with the pinion 22 mounted on the short counter shaft 23, which in turn is mounted in the frame bearings 24. A relatively large pinion 25 rigid with pinion 22 is also mounted on the shaft 23 and meshes with the teeth 26 on the blower end of shaft 19; to the end that rotary energy from the drive shaft 11, is imparted to the shaft 19 and thence to the blower 16 mounted thereon.

The eight double headed pistons 27 which operate in the corresponding eight pairs of alined cylinders 10 are structurally designed medially with side apertures 27a for coactive engagement with the four-lobed cam 28 fixed on shaft 11. For this purpose each connective cylinder lining 13 is formed with a wall aperture 13' in its shaft-facing side, thus providing a clearance for said cam 28, where it engages the corresponding piston as the successive cam lobes 28a, 28b, 28c, and 28d come into their power receiving positions.

Each of the sixteen piston heads 27' is provided with a hollow wristpin 29 (see Figs. 2, 8, 8A and 9A) mounted crosswise of the piston, and radially as to shaft 11, in a bearing 30. These wristpins serve as supports for the tapered rollers 31 (see Fig. 2) which are mounted on the interposed cylindrical roller bearings 32 held in place by cages 32' having fingers 32''. The rollers 31 contact the opposite edges or sides of the said cam 28, so that reciprocating movement of the pistons within their cylinders successively engaging lobes 28a, 28b, etc., will act to impart rotary movement to the cam 28 and with it the drive shaft 11 on which it is fixed.

Ball thrust bearings 33 having balls 34 are mounted on the said wristpins 29. Each wristpin is formed exteriorly with a head 35 on its outwardly disposed end and with an inwardly facing shoulder 36 to receive the outer edge or end of the inner bearing race 33' of member 33.

Each wristpin 29 is formed also with a cross opening or hole 29' through its head 35 to receive an adjusting cam pin 37, which pin has end journal parts 38 and 38' to fit in the piston head 27'. One said journal part 38 is enlarged and threaded with a snug fit to facilitate adjustment. The extreme end 38'' of pin 37, next to part 38, is formed to engage a turning tool as will be explained. Each pin 37 has eccentrically disposed parts or cams 37' and 37'' to engage the corresponding walls or wall ends of the wristpin 29, so that rotary movement of the cam pin 37 will serve to move the wristpin 29 lengthwise. Moving it inward toward shaft 11 tightens the roller bearings 33 against the conoidal roller 31 and so takes up any looseness relative to the main cam 28. Thus adjustment of the bearings to compensate for wear is made without need to dismantle the engine.

In order that adjustments may be made readily, openings 39 are formed in the engine block 7; opening 27b is provided in each of the cylinder shells opposite the heads of pins 37; and upon moving the drive shaft to cause the wristpins to rest opposite the corresponding openings 39, one may reach through said openings and adjust the cam-screw-pins 37. Each pin 37 at its large end 38'' is formed with a hexagonal axial indentation 40 to receive an appropriate turning tool, as will be understood. The outside of this end next to screw part 38 as at 38'' is milled to receive a corresponding nut 41 or the like which fits in a square recess 41' in head 27'. Thus, the adjusting cams will be held in their positions of adjustment against movement due to forces of the engine.

Each cylinder 10 has an end wall passage 42 that communicates with an exhaust chamber or manifold 43 by way of a pair of exhaust valves 44 disposed side by side. The valves 44 are held normally in their closed positions by means of coiled springs 45. Duplication of valves 44 is in order that the exhaust gases may escape more freely.

The valve-operating means (see Fig. 3) embodies a hollow shaft 46 that moves radially through a tubular bearing 47, the latter being fixed and forming a part of the engine structure. At the inner end of the shaft 46 of each valve assembly, are arms 48, which extend laterally and diagonally outward with their free ends bearing outwardly through adjusting heads 50 against the inward ends 49' of the valve stems 49. The threaded adjusting heads 50 are screwed into threaded openings 48' of the arms 48, so that the valves 44 carried at the outer ends of said stems may be caused to seat accurately.

Rollers 51 on the inner ends of said shafts 46 of the valve assemblies engage or ride upon a cam 52 fixed on the drive shaft 11, to the end that with each revolution of the drive shaft several pairs of valves 44 will be operated in due sequence to release the exhaust gases from their corresponding cylinders 10'.

It is to be understood that this said valve and control structure is provided in duplicate for each complete cylinder 10, one set at each end, as shown in Fig. 2. Hence, the engine block sections 7' and 7'' are alike in this respect. And it will be noted that the structural arrangement and operation is such that four cylinders 10' perform or accommodate identical balanced functions simultaneously, dividing the forces on the four-lobed cam 28 into two equal couples around the rim of said cam. This action in effect is progressive and continuous with resultant smoother operation.

I have shown fuel nozzles 53 (see Figs. 2 and 13) as mounted at the outer ends of the cylinders 10 to supply the necessary fuel to be fired in the cylinders, operating the pistons 27 moving therein. Fuel is supplied through pipes 58 directly to ignition chambers 42'. The said nozzles 53 are mounted in adapters 59 which may be changed readily by removing bolts 60. When these adapters 59 have been removed, they may be replaced by any one of the adapters shown by Figures 13, 14, 15, 16 or 17. Thus is provided an engine which may be converted readily from a Diesel type of engine to a gasoline or natural gas burning engine.

In the modified construction shown by Fig. 6 the cam 54, four lobed as in Figs. 2 and 19 and generally similar to cam 28, is provided with teeth 55 on the outward side edges thereof, to mesh with toothed rollers or pinions 56 carried on wristpin 29 in the pistons, thereby providing positive connections between the pistons and said cam 54, and thus insuring against slippage between the pinions and said cam.

By replacing the adapters 59 with adapters with spark plugs such as indicated at 57, the engine may be converted from the Diesel type engine, to the internal combustion engine type, in which case the usual gas charge will enter the cylinders and fire after compression.

By following the diagram as shown by Figure 12, the timing or firing of the cylinders may be readily observed. As for example, the cylinders A at one end of the engine block are both fired at once and the cylinders B at the opposite end of the engine block are also both fired at once and simultaneously with the firing of the cylinders A. While the diagram illustrates an 8-cylinder engine, the principle of the invention may be carried out with any number of cylinders required, it being understood however that an equal number of cylinders at each end of the engine block are fired simultaneously and in mutually balanced relation, thereby insuring complete balance of the forces to minimize and substantially eliminate vibration.

It might be further stated that the multilobed cam is generated from an ellipse, and not from a circle as is common in the formation of multi-lobed cams. Due to this construction, the cam action allows more time, at the bottom of the stroke of each piston for scavenging and supercharging, and at the top of the stroke for flame propagation thereby assuring a high speed Diesel engine structure.

Minor features of the device of this invention are the fuel pump 61, water pump 62, lubricating oil pump 63, air starter 64. A gear box 65 is shown on Fig. 1.

Figure 1:
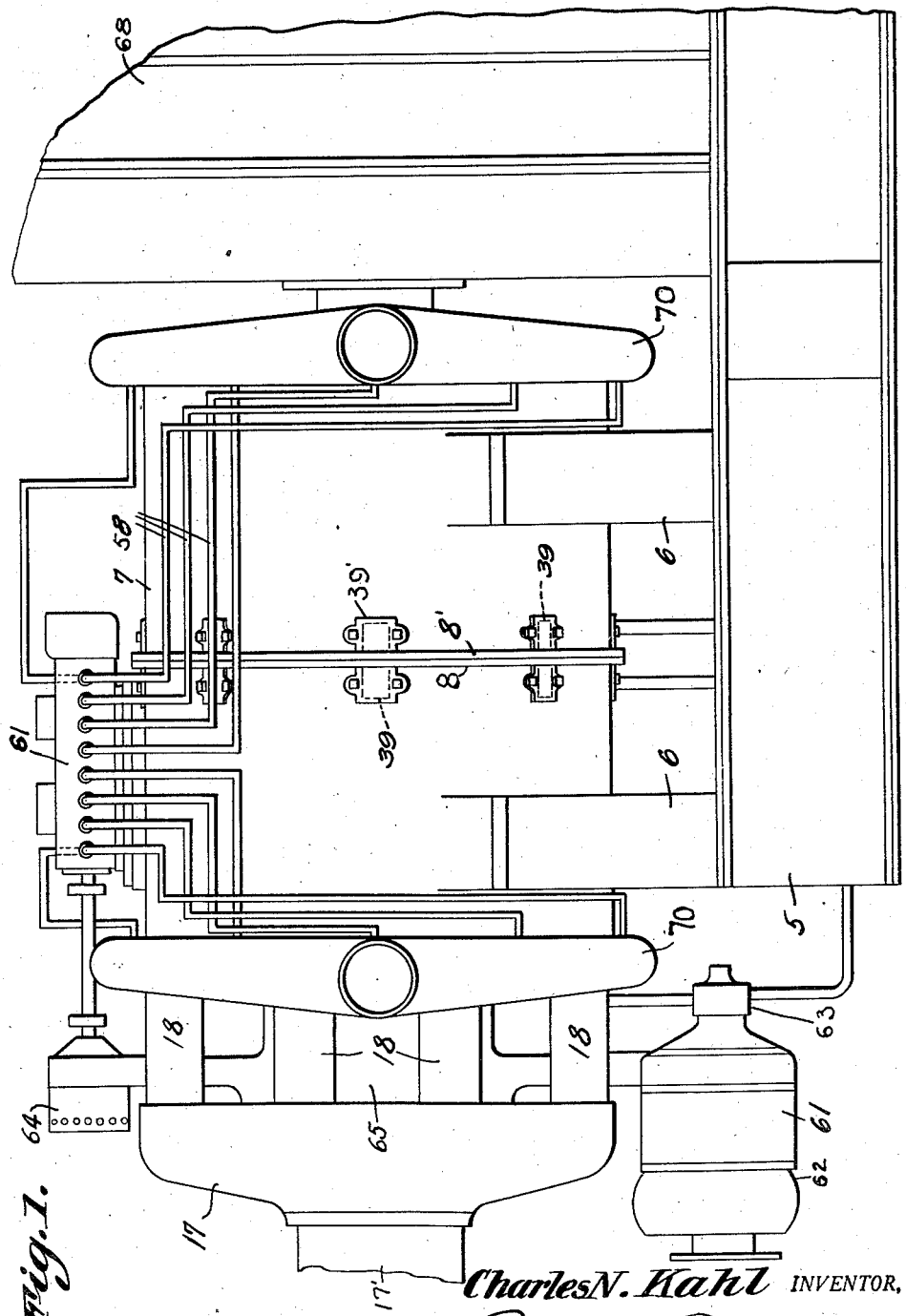
Figure 1 is a side elevational view of an engine constructed in accordance with my invention and having eight duplex pistons and cylinders, twice the number of cam lobes. (See Figs. 4 and 19.)

At the right of Fig. 1 is shown a typical load device 68.

On each end of the engine is an exhaust manifold 70 to which appropriate cylinder elements 10' are connected respectively by way of passages 43.

Lubrication ducts 73 (see Figs. 2, 3 and 4) are disposed near the shaft 11. The double-throw nozzles 74 play oil into the oppositely disposed bearings 28'. The single throw nozzles 75 play oil onto the main cam or wabble plate 28. Jets of oil spray are designated generally by numeral 76.

In describing the engine here illustrated I have sought to make it clearly evident that all explosions are mutually counterbalanced in symmetrical relation, and are thus rendered substantially nil in vibration effect on the engine as a whole. This balancing of forces and shocks is accomplished by firing four cylinders or cylinder elements at a time, two on one side of cam plate 28 simultaneously with two on the other side, but in two axial planes ninety degrees apart.

For instance, referring to Fig. 12, occurrences in the two diametrically opposite cylinder ends A—A at one end of the engine (left) are currently alike; and also there are like concurrent events in the two diametrically opposite cylinder ends B—B located at the opposite end of the engine (right) and in an axial plane ninety degrees from the axial plane of cylinder ends A—A.

Referring to the legend, which accompanies Fig. 12, the present momentary occurrence in parts A—A and B—B is "explosion." Obviously in practical effect the resultant forces, stresses, impacts and shocks are all mutually balanced and neutralized. This assures quiet running and great endurance, with a minimum amount of care and expense for maintenance.

I claim:

1. An internal combustion device comprising an engine-block, a shaft journaled therein, a multilobe cylindrical cam fixed on said shaft, said cam having a cam face on each side thereof adjacent to its marginal edge, each of said cam faces forming an undulating curve generated from an ellipse, double-ended pistons and corresponding double-ended cylinders disposed symmetrically about said shaft and relative to said cam, the pistons in driving relation to said cam, and firing means for each of the cylinder-end parts respectively, said firing means being organized and connected in groups for simultaneous firing of particular corresponding sets of cylinders in due relation for mutually balancing the thrust impact of each piston by that of another.

2. A wabble-plate cam engine having a combined main shaft and cam-plate, said cam-plate having a cam face on each side thereof, each of said cam faces forming an undulating curve generated from an ellipse, a plurality of internal combustion chambers and pistons therefor disposed about said shaft in mutually parallel geometrical symmetry, and means to fire said chambers in self-balancing groups.

3. An internal combustion motor of the barrel type comprising an engine block with an even number of double cylinders formed therein with a central shaft about which the cylinders are symmetrically disposed in parallel relation, and a correspondingly formed multilobe cam disposed and fixed medially on said shaft with an effective part of each double cylinder on each side thereof, said cam having a cam face on each side thereof, adjacent to its marginal edge, each of said cam faces forming an undulating curve generated from an ellipse, a corresponding set of double pistons each at its central connecting part being formed and disposed operatively to engage said cam, and means to fire and otherwise operate said cylinders and pistons sequentially in balanced groups to minimize and avoid vibration.

4. In a two-cycle engine of the multilobed cam type having a shaft and a cam thereon, said cam having a cam track on each side thereof positioned along the marginal edge thereof, each of said cam tracks forming an indulating curve generated from an ellipse, and internal combustion cylinders disposed symmetrically around said shaft and equidistantly therefrom, the number and arrangement of such cylinders in relation to the cam lobes being such that all explosion forces are balanced both axially and diametrically and also being such that all forces of the pistons both from explosion and inertia are resolved into equal and opposite couples.

5. An internal combustion engine of the class described comprising a block having combustion cylinders of double-ended design formed in parallel relation therein, a combined rotary shaft and wabble plate cam disposed in symmetrical relation to said cylinders, said wabble plate having cam faces on both sides of said plate which form an undulating curve generated from an ellipse, double-ended pistons for said cylinders and operatively related to said cam to drive said shaft, and means to fire said cylinders in counter-balancing groups about said shaft.

6. In an engine of the class described, a shaft with a cylindrical cam fixed thereon, said cam having cam faces on both sides thereof adjacent its marginal edge, which form an undulating curve generated from an ellipse and thereby providing a series of symmetrically disposed similar lobes disposed in the direction of said shaft, in combination with a series of effectively organized internal combustion cylinders and pistons arranged in parallel with one another symmetrically about said shaft, said cylinders being numerically a multiple of the number of cam lobes and being operably connected and designed for effectively balanced firing in pairs and couples disposed opposite each other relative to said shaft.

7. In an internal combustion engine of the type comprising an engine block, an engine shaft passing substantially centrally through the block, said block having a plurality of coaxial cylinders of double ended design arranged concentrically about the shaft and parallel thereto, and double ended pistons in said cylinders; means for transmitting the motion of said pistons to the shaft, including an axial cam secured to the shaft and having lobes on opposite faces thereof which lobes form an undulating curve generated from an ellipse, and cam engaging members carried by the pistons intermediate their ends.

8. The apparatus described in claim 7 wherein the number of double ended cylinders is a multiple of the number of lobes on said cam.

9. In an engine of the type comprising a shaft, a plurality of double ended cylinders disposed concentrically about the shaft and parallel thereto, pistons in said cylinders; means for transmitting the motion of the pistons to said shaft comprising a multilobed axial cam secured to said shaft, and cam engaging members carried by the several pistons, the number of said cylinders being proportioned to the number of cam lobes so that power impulses from diametrically opposed pairs of pistons on opposite sides of the cam and displaced about the axis of the shaft 90° with respect to each other will be simultaneously transmitted to said cam successively.

10. The apparatus described in claim 9 wherein there are eight cylinders at each side of the cam and wherein the cam has four lobes, there being two lobes on each axial face thereof, each set of lobes forming an undulating curve generated from an ellipse.

11. In a barrel type engine including an engine block having a circular series of ported cylinders at each end thereof, means defining annular air chambers within the block and substantially surrounding the ported portion of the cylinders of the respective series, a blower at one end of the engine, air delivery means connected to said blower and including air passages within and extending longitudinally of said engine and communicating with the blower and with both of said annular air chambers whereby to deliver air uniformly to all of said cylinders.

12. In a barrel type engine including an engine block having a circular series of ported cylinders at each end thereof, means defining annular air chambers within the engine block and substantially surrounding the ported portion of the cylinders of the respective series, a blower at one end of the engine, a substantially annular air distributor communicating with the blower to receive the air discharged therefrom, air delivery means in communication with said annular air distributor and including a plurality of air passages within and extending longitudinally through said engine block, said passages being disposed respectively between adjacent pairs of cylinders and substantially parallel to the axes thereof and communicating with both of said annular air chambers, whereby to deliver aid uniformly to all of said cylinders.

13. A motion transmission mechanism comprising a plurality of members mounted for reciprocation, in generally parallel paths, spaced circumferentially about an axis, a rotary member mounted for rotation on said axis, a laterally projecting annular flange carried by said rotary member and provided with an axially disposed undulating cam surface on each of its opposite faces, spaced rollers carried by each of said reciprocating members and respectively engaging said cam surfaces in opposed relations, and cooperating intermeshing toothed gear elements carried by the rollers and by the flange in juxtaposed relation to the respective cam surfaces thereon to inhibit slipping between the rollers and cams as the reciprocating members reciprocate.

14. In a barrel type engine including a shaft and a plurality of cylinders uniformly distributed in a circular series concentrically thereabout, and a double-ended piston in each cylinder; means for communicating the reciprocating motion of the pistons to rotary motion of the shaft including an annular laterally projecting flange carried by the shaft, and provided with an axially disposed undulating cam surface on its opposite faces, spaced rollers mounted in each of said pistons for rotation about axes disposed substantially radially of said shaft, said rollers respectively engaging said cam surfaces in opposed relation, and intermeshing toothed gear elements operatively associated with the rollers and with said cam surfaces whereby to insure rolling, nonslipping engagement between the rollers and cam surfaces.

15. In an internal combustion engine of the type comprising a drive shaft, a plurality of coaxially arranged cylinders distributed uniformly around said drive shaft and pistons operating within the cylinders; means for converting the reciprocating movement of the pistons to rotary movement of the shaft including a multi-lobed axial cam secured to the shaft, spaced rollers mounted within the pistons for rotation about axes perpendicular to the axis of the shaft and engaging the cam on opposite faces thereof, and imparting rotary movement to the cam and shaft when the pistons operate, and means for providing a positive engagement contact between the rollers and cam, said means embodying teeth on the rollers meshing with teeth on the working edges of the cam.

16. The apparatus described in claim 15 wherein the number of cylinders disposed concentrically about the shaft is an even multiple of the number of lobes on the cam.

17. The apparatus described in claim 15 wherein the lobes of said cam are curves generated from an ellipse.

18. An internal combustion motor of the barrel type comprising an engine block with an even number of double cylinders formed therein and with a central shaft about which the cylinders are symmetrically disposed in parallel relation, mounted within the block for rotation, a multilobe cam disposed and fixed medially on the shaft with an effective part of each double cylinder on each side thereof, said cam having a cam face on each side thereof, adjacent to its marginal edge, each of said cam faces forming an undulating curve generated from an ellipse, a corresponding set of double pistons each at its central connecting part being formed and disposed operatively to engage said cam, and means to fire and otherwise operate said cylinders and pistons sequentially to rotate the shaft.

19. A two cycle internal engine of the class described comprising an engine block having combustion cylinders of double-ended design formed in parallel relation therein, a shaft mounted within the engine block for rotation about an axis centrally disposed with respect to said cylinders, a wabble plate cam secured to said shaft, said wabble plate cam having a cam face on either side thereof, each of said cam faces forming an undulating curve generated from an ellipse, double-ended pistons within said cylinders and operatively related to said wabble plate cam to drive said shaft, and means to fire said cylinders.

CHARLES N. KAHL.

Certificate of Correction

Patent No. 2,398,378. April 16, 1946.

CHARLES N. KAHL

It is hereby certified that errors appear in the printed specification of the above numbered patent requiring correction as follows: Page 5, first column, line 29, claim 11, for the words "of said engine" read *through said engine block*; line 30, same claim strike out "with the blower and"; line 49, claim 12, for "aid" read *air*; and that the said Letters Patent should be read with these corrections therein that the same may conform to the record of the case in the Patent Office.

Signed and sealed this 9th day of July, A. D. 1946.

[SEAL]

LESLIE FRAZER,
*First Assistant Commissioner of Patents.*